(12) United States Patent
Liang

(10) Patent No.: US 8,701,160 B2
(45) Date of Patent: Apr. 15, 2014

(54) NETWORK SECURITY HTTP NEGOTIATION METHOD AND RELATED DEVICES

(75) Inventor: Jiehui Liang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 31 days.

(21) Appl. No.: 13/181,621

(22) Filed: Jul. 13, 2011

(65) Prior Publication Data

US 2011/0271326 A1 Nov. 3, 2011

Related U.S. Application Data

(63) Continuation of application No. PCT/CN2009/072813, filed on Jul. 17, 2009.

(30) Foreign Application Priority Data

Jan. 21, 2009 (CN) .......................... 2009 1 0000901

(51) Int. Cl.
*H04L 29/06* (2006.01)

(52) U.S. Cl.
USPC .......................................................... 726/3

(58) Field of Classification Search
USPC .......................................................... 726/3
See application file for complete search history.

(56) References Cited

U.S. PATENT DOCUMENTS

2006/0155869 A1* 7/2006 Nanduri et al. ............... 709/232
2006/0280305 A1 12/2006 Bajko et al. .................. 380/270
2007/0218875 A1 9/2007 Calhoun et al. ............... 455/411
2007/0249342 A1* 10/2007 Huang et al. ............... 455/435.1
2009/0013381 A1* 1/2009 Torvinen et al. ................ 726/3

FOREIGN PATENT DOCUMENTS

| CN | 1681239(A) | 10/2005 | ............... H04L 9/12 |
| CN | 101478755(A) | 7/2009 | ............ H04W 12/08 |
| CN | 101483860(A) | 7/2009 | ............ H04W 12/00 |
| WO | WO2004/008712 A1 | 1/2004 | |

* cited by examiner

Primary Examiner — Jason Gee
(74) Attorney, Agent, or Firm — Christopher P. Maiorana, PC

(57) ABSTRACT

The present invention discloses a network security HTTP negotiation method and related devices. the method comprises: a server receiving an HTTP request message with a header field sent by a terminal, wherein the header field indicates security mechanism(s) supported by the terminal, or the security mechanism(s) supported by the terminal and indication parameter(s) which show that the terminal has been in an accessing safety state; the server parsing the HTTP request message, and sending a response message with negotiated security mechanism(s) supported by the server and priority parameter(s) thereof to the terminal according to the result of the parsing if the header field of the request message indicates the security mechanism(s) supported by the terminal; and the server receiving another HTTP request message sent by the terminal again to authenticate security mechanism(s) selected by the terminal, wherein the header field of the request message indicates the security mechanism(s) selected by the terminal according to the response message and the priority parameter(s) of the security mechanism(s). The invention expands the HTTP protocol, solves the problem that the terminal security mechanisms are difficult to be deployed, and improves the network service quality.

10 Claims, 3 Drawing Sheets

NETWORK SECURITY HTTP NEGOTIATION METHOD AND RELATED DEVICES

This is a continuation of International Application PCT/CN/2009/072813, with an International Filing Date of Jul. 17, 2009, which claims priority to Chinese Application No. 200910000901.X, filed Jan. 21, 2009, each of which is incorporated by reference.

FIELD OF THE INVENTION

The present invention relates to the technical field of a communication security, and in particular to a network security HTTP negotiation method and related devices.

BACKGROUND OF THE INVENTION

Since a packet network is mainly used for sharing resources without giving much consideration to a security problem when it emerges at the beginning, the security problem is paid more and more attention with the continuous popularization of the internet. From an access layer to an application layer, each of the layers is provided with a corresponding security mechanism to protect corresponding data flow.

For a wireless local area network, the security mechanism is mainly manifested as an authentication during accessing. The security mechanisms emerged successively mainly comprise: a Wired Equivalent Privacy (WEP), a Wi-Fi protected access (WPA), a WPA-2, an 802.1x, and a national standard WLAN authentication and privacy infrastructure (WAPI) of China. Wherein some of the mechanisms adopt a symmetric encryption algorithm, for example, the WEP and the WPA-TKIP (temporal key integrity protocol) use an RC4 encryption algorithm itself. These two security modes are easy to be attacked due to the problems of the algorithm. During the establishment process of the wireless local area network national standards, the WAN is used to replace the WEP; and a public infrastructure is used to realize the authentication between a terminal and an access point, so that the security of the wireless local area network is greatly improved.

The security of a network layer consists of a series of security protocols, performs an identification authentication and a key negotiation by an internet key exchange (IKE), establishes a Peer-to-Peer security association according to a security policy database, and realizes a data privacy transmission on an internet protocol (IP) layer. With the continuous perfection of the standards, solutions with various expanded IPsec (IP_SECURITY) has emerged.

A TLS/SSL (transport layer security protocol/secure socket layer) is used to provide an encryption protocol for the data integrity and the security of transmission control protocol (TCP) communication, is widely used in a web page browsing, e-mail(s), instant message(s) and Voice over IP (VoIP) call(s), and can also be used to protect user datagram protocol (UDP) flow after being expanded.

However, since the above security mechanisms are suitable for different situations, if there is not any proper negotiation mechanism, the various security mechanisms will be difficult to be deployed, for example, the terminal has no means to know the security mechanism which can be adopted by a corresponding server or the various security mechanisms are used at the same time, the network service quality will is reduced.

SUMMARY OF THE INVENTION

The present invention provides a network security HTTP negotiation method and related devices, which is used to solve the problem in the prior art that various security mechanisms are difficult to be deployed because the security mechanisms are suitable for different situations.

In order to achieve the above object, the present invention provides a method of a network security HTTP negotiation method which comprises the following steps:

A, a server receiving an HTTP request message with a header field sent by a terminal, wherein the header field indicates security mechanism(s) supported by the terminal, or the security mechanism(s) supported by the terminal and indication parameter(s) which show that the terminal has been in an accessing safety state;

B, the server parsing the HTTP request message, and sending a response message with negotiated security mechanism(s) supported by the server and priority parameter(s) thereof to the terminal according to the result of the parsing if the header field of the request message indicates the security mechanism(s) supported by the terminal; and C, the server receiving another HTTP request message sent by the terminal again to authenticate security mechanism(s) selected by the terminal, wherein the header field of the request message indicates the security mechanism(s) selected by the terminal according to the response message and the priority parameter(s) of the security mechanism(s).

The step of authenticating the security mechanism(s) selected by the terminal in the step C specifically comprises: parsing the another HTTP request message sent by the terminal again, and authenticating whether the security mechanisms indicated in the header field of the request message are the security mechanisms selected by the terminal provided by the server via the response message so as to confirm that negotiated security mechanisms in the step B are not modified.

The method provided by the present invention also comprises a following step after the above step C: judging whether the security mechanism(s) selected by the terminal pass the authentication; wherein if the security mechanisms pass the authentication, the server transmits data to the terminal; otherwise, the server sends error prompt information to the terminal.

It should be noted when the terminal locates within a wireless network, the method further comprises a following step before the step A:

the terminal sending an association request message to a network access point, and establishing an association with the wireless network after the network access point responds the association request.

Based on the above conditions, when the security mechanisms are used during the process of establishing the association between the terminal and the network access point, in the step A, the header field of the HTTP request message received by the server indicates the security mechanisms supported by the terminal and the indication parameter(s) which show that the terminal has been in the accessing safety state.

In the step B, if the header field of the HTTP request message indicates the security mechanisms supported by the terminal and the indication parameter(s) which show that the terminal has been in the accessing safety state, the server will judge whether to use the other security mechanisms; wherein if it is determined not to use the other security mechanisms, security mechanisms used by the terminal during the process of establishing the association will be used to transmit data; otherwise, the server will send the response message with the security mechanisms used by the server and the priority parameter(s) thereof; and the step C will be executed.

The present invention also provides a network security HTTP negotiation terminal, which comprises:

a first request message sending unit, configured to send an HTTP request message with a header field to a server; wherein the header field indicates security mechanism(s) supported by a terminal, or the security mechanism(s) supported by the terminal and indication parameter(s) which shows that the terminal has been in an accessing safety state;

a response message receiving unit, configured to receive a response message sent by the server, select security mechanism(s) for a present data transmission according to the response message, and establish a security channel; and a second request message sending unit, configured to send, after adding the security mechanism(s) selected by the response message receiving unit and priority parameter(s) of the security mechanism(s) into the header field of the HTTP request message, the HTTP request message to the server.

It should be noted that when the terminal locates within a wireless network, the terminal also comprises:

an association request sending unit, configured to send an association request messages to a network access point, and establish an association with the wireless network after the network access point responds the association request.

The present invention also provides a network security HTTP negotiation server which comprises:

a request message receiving unit, configured to receive an HTTP request message with a header field sent by a terminal, wherein the header field indicates security mechanisms supported by the terminal, or the security mechanisms supported by the terminal and indication parameter(s) which show that the terminal has been in an accessing safety state;

an indication message judging unit, configured to parse the received HTTP request message, and judge whether indication information in the header field of the HTTP request message is the security mechanisms supported by the terminal, or the security mechanisms supported by the terminal and the indication parameter(s) which show that the terminal has been in the accessing safety state;

a response message sending unit, configured to send, when the indication message judging unit determines that the indication information in the header field of the HTTP request message is the security mechanisms supported by the terminal, a response message with security mechanisms supported by the server and priority parameter(s) thereof to the terminal according to the result of the parsing; and a security mechanism authenticating unit, configured to receive the HTTP request message sent by the terminal again to authenticate security mechanism(s) selected by the terminal, wherein the header field of the request message indicates the security mechanism(s) selected by the terminal according to the response message and priority parameter(s) of the security mechanism(s).

The server provided by the present invention also comprises: an authenticated result judging unit, configured to judge whether the security mechanism(s) selected by the terminal pass an authentication; wherein if the security mechanism(s) pass the authentication, the authenticated result judging unit transmits data to the terminal; otherwise, the authenticated result judging unit sends error prompt information to the terminal.

Further, the response message sending unit is also configured to judge, when the indication message judging unit determines that the indication information in the header field of the HTTP request message is the security mechanisms supported by the terminal and the indication parameter(s) which show that the terminal has been in the accessing safety state, whether to use the other security mechanisms; wherein if it is determined not to use the other security mechanisms, security mechanism(s) used by the terminal during the process of establishing an association will be used to transmit data; otherwise, the response message with the security mechanisms used by the server and the priority parameter(s) thereof is sent to the terminal.

Compared with the prior art, the present invention has the following advantages.

By expanding the HTTP protocol, the present invention ensures that the terminal can add the security mechanisms supported by the terminal into the header field of the HTTP request message which will be sent to the server, and can know the security mechanisms supported by the server via the response message returned by the server. The present invention solves the problem that the terminal security mechanisms are difficult to be deployed, and improves the network service quality.

BRIEF DESCRIPTION OF THE DRAWINGS

In order to explain the solution in the embodiments of the present invention or in the prior art clearly, the drawings used in the description of the prior art or the embodiments of the present invention will be introduced briefly hereinafter. Obviously, the drawings in the following description are only some embodiments of the present invention. For those skilled in the art, the other drawings can be obtained according to these drawings under the premise of without inventive work.

DETAILED DESCRIPTION OF EMBODIMENTS

The solution in the embodiments of the present invention will be clearly and completely described hereinafter in conjunction with the drawings in the embodiments of the present invention. Obviously, the embodiments described are only part of the embodiments of the present invention instead of the whole embodiments. Any other embodiments obtained by those skilled in the art under the premise of without inventive work based on the embodiments of the present invention are included in the protection scope of the present invention.

The present invention provides a network security HTTP negotiation method and related devices, which is used to solve the problem in the prior art that a plurality of security mechanisms are difficult to be deployed because the security mechanisms are suitable for different situations.

Figure 1:
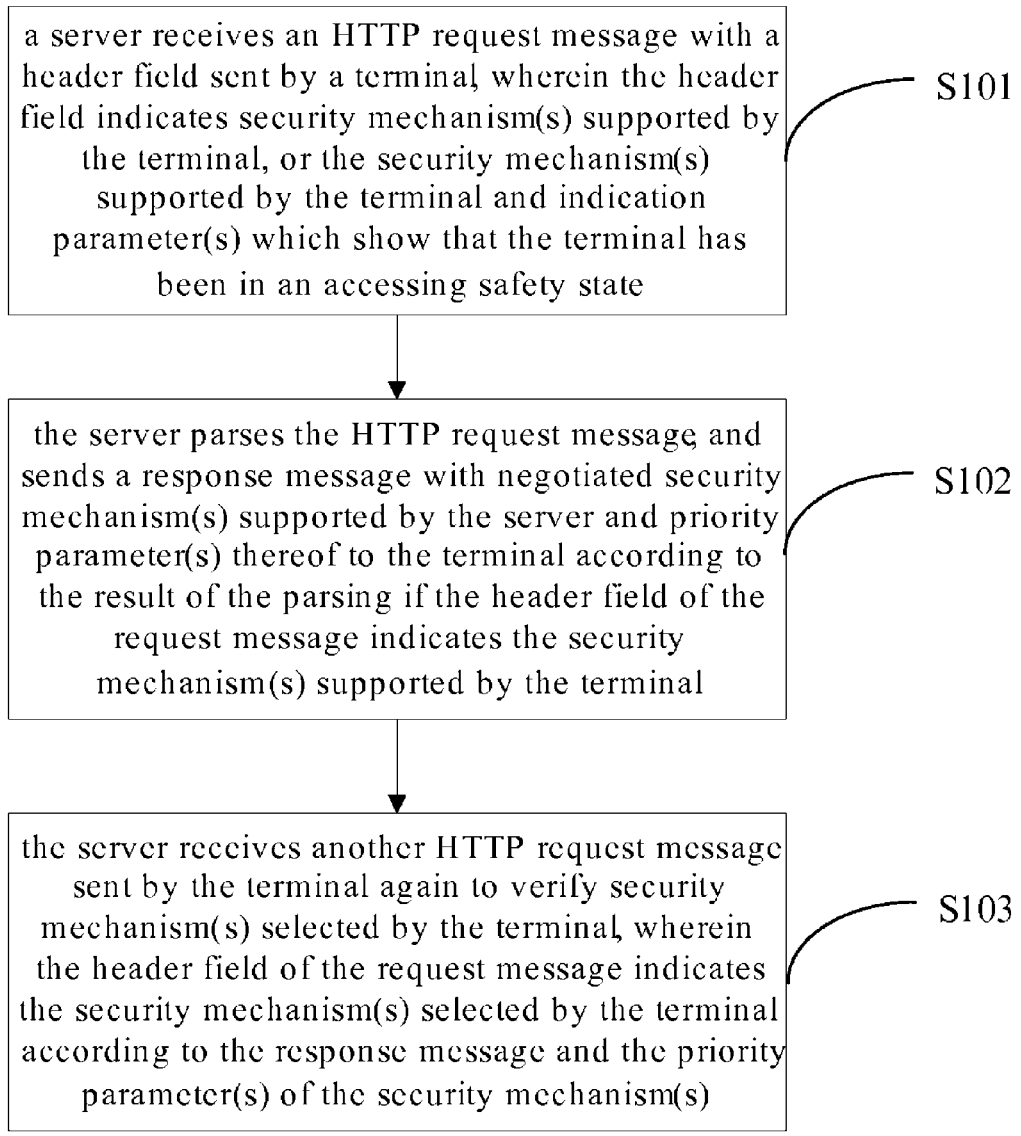
FIG. 1 is a flow chart of a network security HTTP negotiation method provided by the present invention.

The present invention provides a network security HTTP negotiation method. As shown in FIG. 1, the method comprises the following steps.

Step S101, a server receives an HTTP request message with a header field sent by a terminal, wherein the header field indicates security mechanism(s) supported by the terminal, or the security mechanism(s) supported by the terminal and indication parameter(s) which show that the terminal has been in an accessing safety state.

Step S102, the server parses the HTTP request message, and sends, according to the result of the parsing, a response message with security mechanism(s) supported by the server and priority parameters thereof to the terminal if the header field of the HTTP request message indicates the security mechanism(s) supported by the terminal.

Step S103, the server receives the HTTP request message sent by the terminal again and authenticates security mechanism(s) selected by the terminal; wherein the header field of the request message indicates the security mechanism(s) selected by the terminal according to the response message and priority parameter(s) of the security mechanism(s).

In this step, the step of authenticating the security mechanism(s) selected by the terminal specifically comprises: parsing the HTTP request message sent again by the terminal, authenticating whether the security mechanisms indicated by the header field of the request message are the security mechanisms selected by the terminal provided by the server via the response message, and confirming that the security mechanisms negotiated in the step S102 are not modified.

After this step, it is judged whether the security mechanism(s) selected by the terminal pass an authentication, wherein if the security mechanism(s) pass the authentication, the server transmits data to the terminal; otherwise, the server sends error prompt information to the terminal.

It should be noted that when the terminal is applied to a wireless network, the method also comprises the following steps before the above step S101.

The terminal sends an association request message to a network access point, and establishes an association with the wireless network after the network access point responds the association request message.

Further, when security mechanisms are used during the process of establishing the association between the terminal and the network access point, in the above step S101, the header field of the HTTP request message received by the server indicates the security mechanisms supported by the terminal and the indication parameters showing that the terminal has been in the accessing safety state.

Further, the step S102 may also be: the server parsing the HTTP request message; if the header field of the HTTP request message indicates the security mechanisms supported by the terminal and the indication parameters which shows that the terminal is in the accessing safety state, the server judging whether to use the other security mechanisms, wherein if it is determined not to use the other security mechanisms, the security mechanisms used by the terminal during the process of establishing the association will be used to transmit data; otherwise, the server will send the response message with the security mechanisms used by the server and the priority parameter(s) of the security mechanisms to the terminal; and the step S103 will be executed.

By expanding the HTTP protocol, the network security HTTP negotiation method provided by the present invention ensures that the terminal can add the security mechanisms supported by the terminal into the header field of the HTTP request message which will be sent to the server, and can know the security mechanisms supported by the server via the response message returned by the server. The method solves the problem that the terminal security mechanisms are difficult to be deployed, and improves the network service quality at the same time.

The specific implementation process of the network security HTTP negotiation method provided by the present invention will be described in details hereinafter by a specific embodiment.

The method provided by the embodiment is used in the wireless local area network. The HTTP protocol between the terminal and a proxy server is expended in this embodiment so that various security mechanisms can be negotiated. In order to manage the security of the wireless local area network, the network structure of the wireless accessing is required to be adjusted slightly, for example, an access service unit (ASU) function in a WAPI security is integrated into an HTTP proxy server, and an authentication, authorization, accounting (AAA) protocol function used in the 802.1x is also deployed in the HTTP proxy server.

The embodiment introduces three new HTTP header fields: a Security-Client, a Security-Server and a Security-Verify. Each of the header fields consists of a security mechanism name and priority parameters thereof. The security mechanism names are shown in table 1. After each of the security mechanisms, a semicolon is used to separate the security mechanism with the priority parameters of the security mechanisms. In the embodiment, the priorities of the security mechanisms are represented by the value q, the value of the priority parameter q is used to designate the order of applicable security mechanisms. If the values of q are same and maximal, it means that two security mechanisms can be adopted at the same time, e.g. an HTTP abstract authentication and an AKA authentication.

TABLE 1 various security mechanisms

| security mechanism Name | Description |
| --- | --- |
| wlan-eap | a port authentication mechanism of a criterion IEEE 802.1x is used; |
| wlan-wapi | the national standard wireless local area network authentication and privacy infrastructure is used; |
| ipsec-ikev1 | an IP security mechanism for performing an internet key exchange with an RFC2409 of an IETF is used; |
| ipsec-ikev2 | an IP security mechanism for performing the internet key exchange with an IKEv2 of an RFC4306 of the IETF is used; |
| ipsec-manual | an IP security mechanism by setting a pre-sharing key; |
| ipsec-3gpp | an IP security mechanism defined by 3GPP TS33.203; |
| Tls | a transmission layer security specification standardized by an IETF RFC2246 and an RFC5246; |
| Digest | an abstract authentication mechanism designated by an IETF RFC2617; |
| Aka | The abstract authentication mechanism using the AKA and designated by an IETF RFC3310. |

Figure 2:
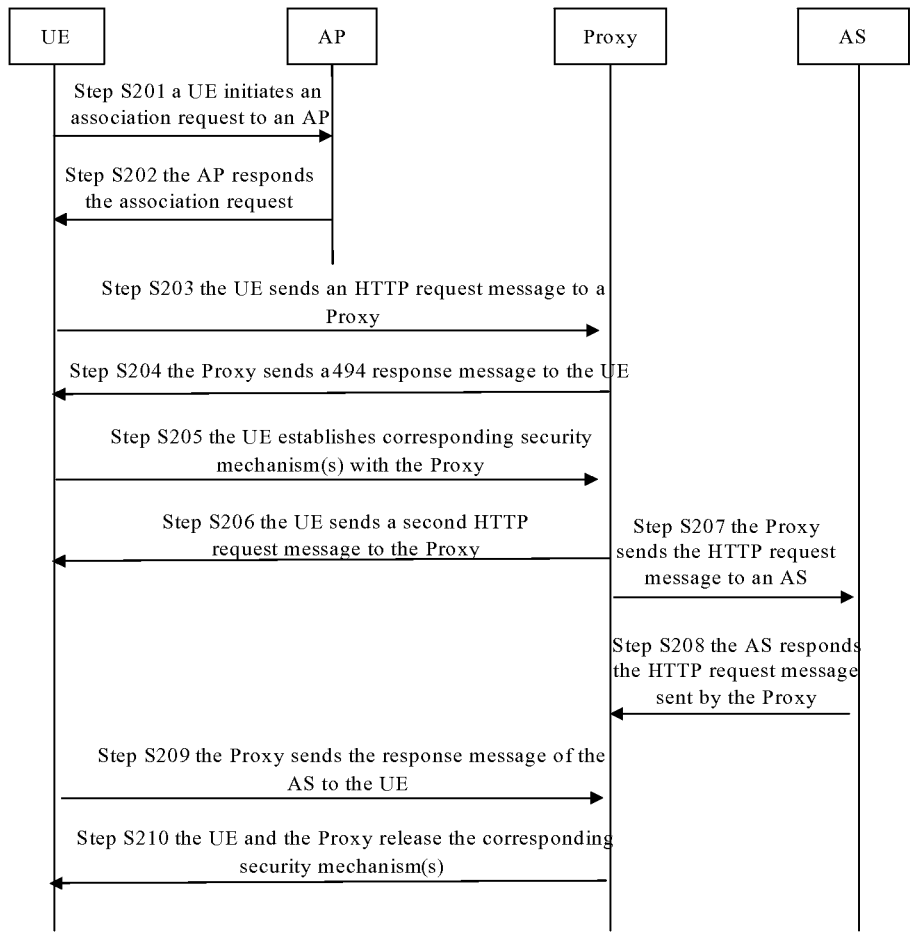
FIG. 2 is a flow chart of a network security HTTP negotiation process provided by an embodiment of the present invention.

In the present embodiment, assuming that the terminal has a WLAN ability and can initiate a port authentication ability of the 802.1x and a WAPI security, the terminal can perform a security negotiation process with two security mechanisms of the wlan-wapi and the wlan-eap. The negotiations of the ipsec-ikev1, the ipsec-ikev2, the ipsec-manual and the ipsec-3gpp can be respectively performed according to the ipsec client side functions of the terminal. In the present embodiment, assuming that the terminal has the security mechanisms listed above, the negotiation process between the terminal and the proxy server realized by the present embodiment is shown in FIG. 2 and comprises the following steps.

Step S201, a user equipment (UE, the terminal) initiates an association request primitive to an access point (AP).

It should be noted that since the UE can perform the negotiation applications of a plurality of security mechanisms via the HTTP, no the security mechanism can be used in this step, or the security mechanism(s) can be used.

Step S202, after receiving the association request, the AP opens a controlled data port, allows the data of the terminal to pass through, establishes an association between the terminal and a wireless local area network, and sends an association response to the UE.

Step S203, the UE needs to visit a WEB service, and send a first HTTP request to a proxy according to the configuration information of the UE.

In this step, if the terminal does not use any security mechanism during the association process with the AP, the terminal will add the security mechanisms supported by the terminal into the header field security-client of the HTTP request; and step S204 will be executed. Specifically, the HTTP request message is as follows:

GET http://proxy.example.comp/sip:136888888 @proxy.example.com/index HTTP/1.1
Security-Client: tls
Security-Client: ipsec-ikev1
Security-Client: wlan-eap
Security-Client: wlan-wapi
Require: sec-agree
Proxy-Require: sec-agree If the terminal uses security mechanisms during the association process with the AP, the terminal will add the security mechanisms supported by the terminal and indication parameter(s) which show that the terminal has been in an accessing safety state into the header field security-client of the first HTTP request. The indication parameter(s) indicate that the terminal has been in the accessing safety state. When receiving the HTTP request message with the security mechanisms supported by the terminal and the indication parameter(s) which shows that the terminal has been in the accessing safety state, the proxy server determines whether to use the other security mechanisms, wherein if it is determined not to use the other security mechanisms, the security mechanisms used during the association process of the AP and the terminal will be used to transmit data, and the negotiation of the security mechanisms is not necessary to be performed; otherwise, the proxy server will send a 494 response message with the security mechanisms adopted by the proxy server and the priority parameters thereof to the terminal; and the step S205 will be executed. It should be noted that the security mechanisms supported by the terminal which is received by the proxy server include or merely include the security mechanisms used by the terminal during the association process.

Step S204, after receiving the HTTP request message from the UE, the proxy server (Proxy) parses the header field of the request message. When the result of the parsing shows that the negotiation of a plurality of security mechanisms can be performed, the proxy server (Proxy) suggests, according to the security mechanisms supported by the proxy server (Proxy), the UE to use one of the security mechanisms via the 494 response message. If the proxy server (Proxy) is suitable for a plurality of security mechanisms at the same time, the priority parameter(s) of the security mechanism(s) are required to be added into the response message. For example, the HTTP response message may be:

HTTP/1.1 494 Security Agreement Required
Security-Server: wlan-wapi; q=0.3
Security-Server: ipsec-ikev1; q=0.1
Security-Server: tls; q=0.2

Step S205, the terminal establishes a security channel between the terminal UE and the proxy server (Proxy) according to the security mechanism designated in the 494 response message.

Specifically, if the IPsec mechanism is used, the security association between the UE and the proxy server (Proxy) is established by the IKE. If the TLS mechanism is required to be used, a certificate exchange and an identification authentication are carried out by a Diffie-Hellman mechanism; a session key is negotiated out to encrypt the TCP flow; and the TCP transmission between the UE and the proxy server Proxy is protected. In the present embodiment, the wlan-wapi mechanism is used, a current AP association is required to be released at first, and the access authentication is performed again in a WAPI frame to establish an access layer security channel.

Step S206, the UE initiates a second HTTP request in the established security channel, wherein the header field of the second HTTP request message comprises the security-verify to prevent and reduce security attack. The specific HTTP request message is as follows:

GET http://proxy.example.comp/sip:136888888@proxy.example.com/index HTTP1.1
Security-Verify: wlan-wapi; q=0.3
Security-Verify: ipsec-ikev1; q=0.1
Security-Verify: tls; q=0.2
Require: sec-agree
Proxy-Require: sec-agree Step S207, the proxy server (Proxy) authenticates whether the Security-Verify of the second HTTP request message of the UE is consistent with the security mechanisms of itself. If it is determined to be consist, it means that the security mechanisms in the first HTTP response are not modified, the HTTP request is re-modified to remove some header fields related to the present security negotiation, such as the option sign sec-agree of the Proxy-Require, the Require, and the Security-Verify, and sends the HTTP request to an AS (application server); and if it is determined to be inconsistent, the HTTP request fails, and the Proxy returns error prompt information.

Step S208, the AS responds the HTTP request, and if it is successful, the AS returns a HTTP response with a response code of 2XX.

Step S209, after receiving the HTTP response of the AS, the proxy server (Proxy) adds the header field used by the negotiated security mechanisms into the HTTP response again, and sends the HTTP response to the UE.

By this way, the HTTP request is ensured to communicate with the proxy server (Proxy) under the protection of the negotiated security mechanisms.

Step S210, when the UE does not need to perform the HTTP request, the corresponding security mechanisms are released, and the UE restores to an original state.

The network security HTTP negotiation method provided by the present embodiment expands the HTTP protocol, and adds the security mechanisms supported by the terminal into the header field of the HTTP request message sent from the terminal to the proxy server; after receiving the response message sent by the proxy server, the terminal can obtain the security mechanism used by the proxy; therefore, the problem that the terminal security mechanisms are difficult to be deployed is solved, and the network service quality is improved at the same time.

Figure 3:
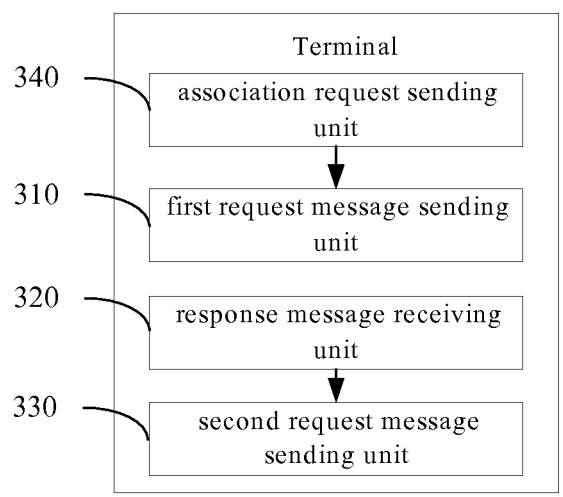
FIG. 3 is a structure diagram of a network security HTTP negotiation terminal provided by the present invention.

The present invention also provides a network security HTTP negotiation terminal. As shown in FIG. 3, the terminal comprises:

a first request message sending unit 310, configured to send an HTTP request message with a header field to a server; the header field indicates security mechanisms supported by the terminal, or the security mechanisms supported by the terminal and indication parameter(s) which show that the terminal has been in an accessing safety state;

a response message receiving unit 320, configured to receive the response message sent by the server, select security mechanism(s) for a present data transmission according to the response message, and establish a security channel; and a second request message sending unit 330, configured to send, after adding the security mechanism(s) selected by the response message receiving unit 320 and priority parameter(s) of the security mechanism(s) into the header field of the HTTP request message, the HTTP request message to the server.

When the terminal locates within a wireless network, the terminal also comprises:

an association request sending unit 340, configured to send a association request message to a network access point, and establish an association with the wireless network after the network access point responds the association request.

Figure 4:
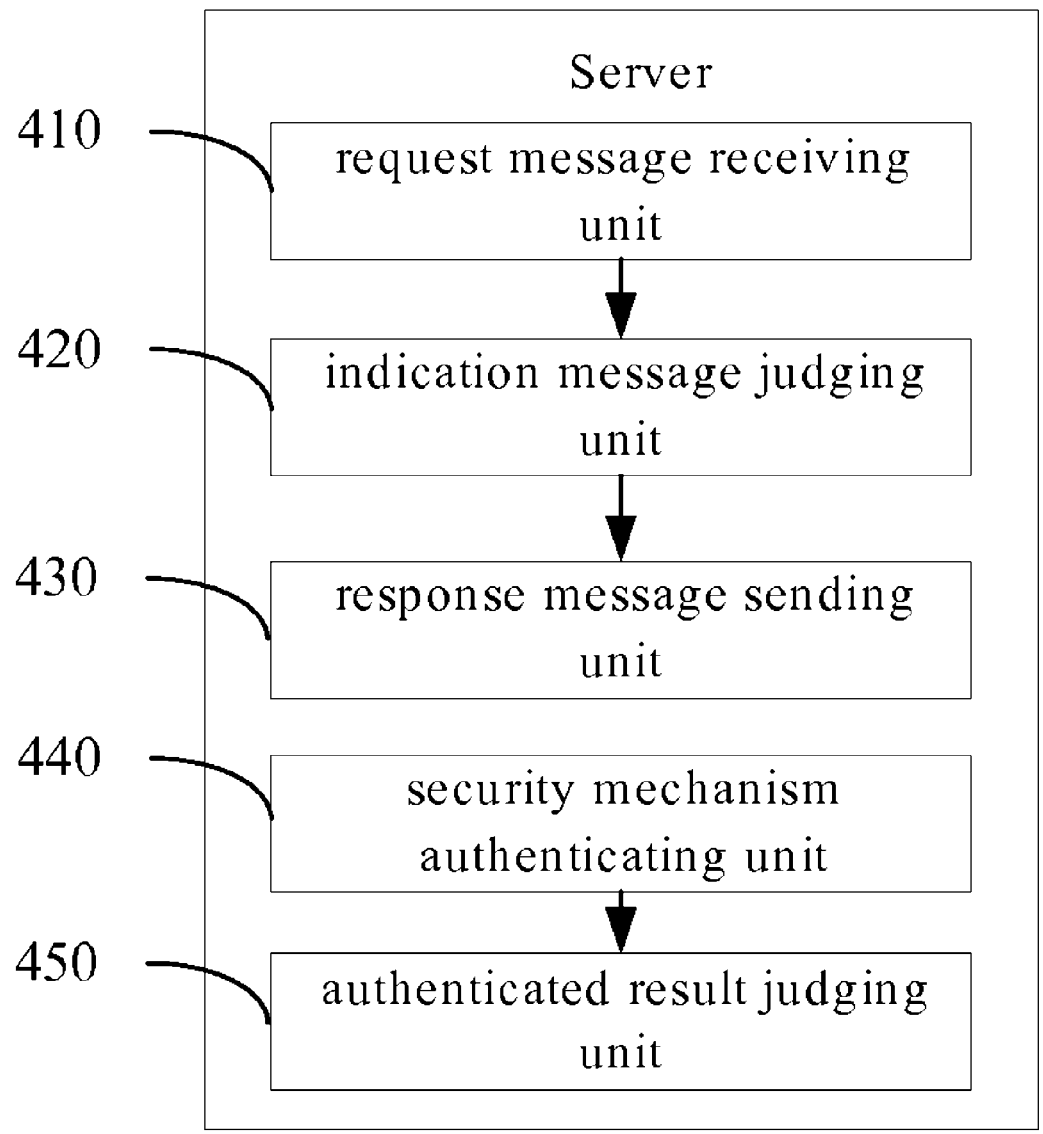
FIG. 4 is a structure diagram of a network security HTTP negotiation server provided by the present invention.

The present invention also provides a network security HTTP negotiation server. As shown in FIG. 4, the server comprises:

a request message receiving unit 410, configured to receive an HTTP request message with a header field sent by a terminal, wherein the header field indicates the security mechanisms supported by the terminal, or the security mechanisms supported by the terminal and indication parameter(s) which show that the terminal has been in an accessing safety state;

an indication message judging unit 420, configured to parse the received HTTP request message, and judge whether indication information in the header field of the HTTP request message is the security mechanisms supported by the terminal, or the security mechanisms supported by the terminal and the indication parameter(s) which show that the terminal has been in the accessing safety state;

a response message sending unit 430, configured to send, when the indication message judging unit 420 determines that the indication information in the header field of the HTTP request message is the security mechanisms supported by the terminal, a response message with security mechanisms supported by the server and priority parameter(s) thereof to the terminal according to the result of the parsing; and a security mechanism authenticating unit 440, configured to receive the HTTP request message sent by the terminal again and authenticate security mechanism(s) selected by the terminal, wherein the header field of the request message indicates the security mechanism(s) selected by the terminal according to the response message and the priority parameter(s) thereof.

In the above, the step of authenticating the security mechanism(s) selected by the terminal specifically comprises: parsing the HTTP request message sent by the terminal again, and authenticating whether the security mechanisms indicated in the header field of the request message are the selected security mechanisms provided by the server via the response message, so as to confirm that an originally negotiated security mechanisms are not modified.

The server provided by the present invention also comprises: an authenticated result judging unit 450, configured to judge whether the security mechanism(s) selected by the terminal pass an authentication; transmit data to the terminal if the security mechanisms pass the authentication; otherwise, send error prompt information to the terminal.

Further, the response message sending unit 430 is also configured to judge, when the indication message judging unit 420 determines that the indication information in the header field of the HTTP request message is the security mechanisms supported by the terminal and the indication parameter(s) which show that the terminal has been in the accessing safety state, whether to use the other security mechanisms; wherein if it is determined not to use the other security mechanisms, security mechanisms used by the terminal during a process of establishing an association will be used to transmit data; otherwise, the response message with the security mechanisms used by the server and the priority parameter(s) thereof will be sent to the terminal.

The network security HTTP negotiation apparatuses provided by the present invention expands the HTTP protocol, wherein the terminal adds the security mechanisms supported by the terminal into the header field of the HTTP request message sent to the server; when receiving the response message of the server, the terminal can obtain the security mechanism used by the server; therefore, the problem that the security mechanisms are difficult to be deployed is solved, and the network service quality is improved at the same time.

Obviously, for those skilled in the art, the present invention may have various changes and variations without deviating from the spirit and principle of the present invention. Therefore, if the changes and variations of the present invention are still within the principle of the claims of the present invention and equivalent technologies thereof, the present invention also intends to include those changes and variations within the protection scope of the present invention.

INDUSTRIAL APPLICABILITY

The present invention provides a network security HTTP negotiation method and related devices, by expending the HTTP protocol, it ensures that the terminal adds the security mechanisms supported by the terminal into the header field of the HTTP request message sent to the server, knows the security mechanisms used by the server via the response message returned by the server; and the problem that the terminal security mechanisms are difficult to be deployed is solved, and the network service quality is improved.

What is claimed is:

1. A network security HTTP negotiation method, comprising the following steps:

A, a server receiving an HTTP request message with a header field sent by a terminal, wherein the header field indicates security mechanism(s) supported by the terminal, or the security mechanism(s) supported by the terminal and indication parameter(s) which show that the terminal has been in an accessing safety state;

B, the server parsing the HTTP request message, and sending a response message with negotiated security mechanism(s) supported by the server and priority parameter(s) thereof to the terminal according to the result of the parsing if the header field of the request message indicates the security mechanism(s) supported by the terminal, wherein if the server is suitable for a plurality of security mechanisms at the same time, the priority parameters of the security mechanisms are required to be added into the response message; and C, the server receiving another HTTP request message sent by the terminal again to authenticate a security mechanism selected by the terminal, wherein the header field of the request message indicates the security mechanism selected by the terminal according to the response message and the priority parameter(s) of the security mechanism(s);

wherein the step of authenticating the security mechanism selected by the terminal in the step C comprises:

parsing the another HTTP request message sent by the terminal again, and authenticating whether the security mechanisms indicated in the header field of the request message is within the security mechanism(s) provided by the server via the response message to be selected by the terminal so as to confirm that the negotiated security mechanism(s) in the step B are not modified.

2. The method according to claim 1, wherein the method further comprises a following step after the step C:

judging whether the security mechanism(s) selected by the terminal pass the authentication; wherein if the security mechanisms pass the authentication, the server transmits data to the terminal; otherwise, the server sends error prompt information to the terminal.

3. The method according to claim 1, wherein when the terminal locates within a wireless network, the method further comprises a following step before the step A:
the terminal sending an association request message to a network access point, and establishing an association with the wireless network after the network access point responds the association request.

4. The method according to claim 3, wherein when the security mechanisms are used during the process of establishing the association between the terminal and the network access point, in the step A, the header field of the HTTP request message received by the server indicates the security mechanisms supported by the terminal and the indication parameter(s) which show that the terminal has been in the accessing safety state.

5. The method according to claim 4, wherein in the step B, if the header field of the HTTP request message indicates the security mechanisms supported by the terminal and the indication parameter(s) which show that the terminal has been in the accessing safety state, the server will judge whether to use the other security mechanisms except the security mechanisms used by the terminal during an association process; wherein if it is determined not to use the other security mechanisms, security mechanisms used by the terminal during the process of establishing the association will be used to transmit data; otherwise, the server will send the response message with the security mechanisms used by the server and the priority parameter(s) thereof; and the step C will be executed.

6. A network security HTTP negotiation terminal, comprising a hardware processor, configured to execute program units, wherein the program units comprising:
a first request message sending unit, configured to send an HTTP request message with a header field to a server; wherein the header field indicates security mechanism(s) supported by a terminal, or the security mechanism(s) supported by the terminal and indication parameter(s) which shows that the terminal has been in an accessing safety state;
a response message receiving unit, configured to receive a response message sent by the server, select security mechanism(s) for a present data transmission according to the response message, and establish a security channel, wherein if the server is suitable for a plurality of security mechanisms at the same time, the priority parameters of the security mechanisms are required to be added into the response message; and
a second request message sending unit, connected to the response message receiving unit and configured to send, after adding the security mechanism(s) selected by the response message receiving unit and priority parameter(s) of the security mechanism(s) into the header field of another HTTP request message, the another HTTP request message to the server to be selected by the terminal, so that the server can authenticate security mechanism(s) selected by the terminal.

7. The terminal according to claim 6, wherein when the terminal locates within a wireless network, the terminal further comprises:
an association request sending unit, connected to the first request message sending unit and configured to send an association request messages to a network access point, and establish an association with the wireless network after the network access point responds the association request.

8. A network security HTTP negotiation server, comprising a hardware processor, configured to execute program units, wherein the program units comprising:
a request message receiving unit, configured to receive an HTTP request message with a header field sent by a terminal, wherein the header field indicates security mechanism(s) supported by the terminal, or the security mechanism(s) supported by the terminal and indication parameter(s) which show that the terminal has been in an accessing safety state;
an indication message judging unit, connected to the request message receiving unit and configured to parse the received HTTP request message, and judge whether indication information in the header field of the HTTP request message is the security mechanism(s) supported by the terminal, or the security mechanism(s) supported by the terminal and the indication parameter(s) which show that the terminal has been in the accessing safety state;
a response message sending unit, connected to the indication message judging unit and configured to send, when the indication message judging unit determines that the indication information in the header field of the HTTP request message is the security mechanism(s) supported by the terminal, a response message with security mechanism(s) supported by the server and priority parameter(s) thereof to the terminal according to the result of the parsing, wherein if the server is suitable for a plurality of security mechanisms at the same time, the priority parameters of the security mechanisms are required to be added into the response message; and
a security mechanism authenticating unit, configured to receive another HTTP request message sent by the terminal again to authenticate a security mechanism selected by the terminal, by parsing the another HTTP request message sent by the terminal again and authenticating whether the security mechanism indicated in the header field of the request message is within the security mechanism(s) provided by the server via the response message to be selected by the terminal so as to confirm that the negotiated security mechanism(s) are not modified, wherein the header field of the another HTTP request message indicates the security mechanism selected by the terminal according to the response message and priority parameter(s) of the security mechanism(s).

9. The server according to claim 8, wherein the server further comprises:
an authenticated result judging unit, connected to the security mechanism authenticating unit and configured to judge whether the security mechanism(s) selected by the terminal pass an authentication; wherein if the security mechanism(s) pass the authentication, the authenticated result judging unit transmits data to the terminal; otherwise, the authenticated result judging unit sends error prompt information to the terminal.

10. The server according to claim 8, wherein the response message sending unit is also configured to judge, when the indication message judging unit determines that the indication information in the header field of the HTTP request message is the security mechanisms supported by the terminal and the indication parameter(s) which show that the terminal has been in the accessing safety state, whether to use the other security mechanisms except the security mechanisms used by the terminal during an association process; wherein if it is determined not to use the other security mechanisms, security mechanism(s) used by the terminal during the process of establishing an association will be used to transmit data; otherwise, the response message with the security mechanisms used by the server and the priority parameter(s) thereof is sent to the terminal.

* * * * *